United States Patent [19]

Havel

[11] Patent Number: 4,692,612

[45] Date of Patent: Sep. 8, 1987

[54] SWITCH POSITION DETECTOR AND INDICATOR WITH MULTICOLOR LIGHT EMITTER

[76] Inventor: Karel Havel, 15 Kensington Road, Apartment #704, Bramalea, Ontario, Canada, L6T 3W2

[21] Appl. No.: 874,028

[22] Filed: Jun. 13, 1986

[51] Int. Cl.[4] .......... G01D 5/34; H01J 1/56

[52] U.S. Cl. .......... 250/229; 250/226; 340/782

[58] Field of Search .......... 250/229, 239, 226; 200/D36; 340/365 P, 782; 361/177

[56] References Cited

U.S. PATENT DOCUMENTS 3,070,677 1/1962 Lowry .......... 335/154

3,758,785 4/1973 Maute .......... 250/229

3,875,456 9/1975 Kano .......... 313/501

4,420,711 12/1983 Takahashi et al. .......... 340/782

4,617,461 10/1986 Subbarao et al. .......... 340/365 P

*Primary Examiner*—David C. Nelms
*Assistant Examiner*—S. Allen

[57] ABSTRACT

A switching device includes a contact movable between two positions, to selectively open and close an electrical path, and a multicolor light emitting diode for indicating different positions of the contact by respectively different colors. The multicolor light emitting diode directs a light beam which is reflected from the contact in accordance with its position on one of two light sensors. The color of the light beam is controlled in accordance with the outputs of the light sensors.

14 Claims, 3 Drawing Figures

SWITCH POSITION DETECTOR AND INDICATOR WITH MULTICOLOR LIGHT EMITTER

BACKGROUND OF THE INVENTION

1. Field of the Invention

This invention generally relates to electromagnetically actuated switches and more specifically to a method and apparatus for verifying correct positions of a contact in a switch.

2. Description of the Prior Art

Commercially well known reed relay usually includes two flat reed contacts enclosed in a sealed tube. The reed contacts are made from soft magnetic material and serve as a core for transferring magnetic flux. When a magnetic field is produced by energizing a winding that surrounds the tube, the reed contacts are mutually magnetically attracted into a contact engagement. To achieve consistent contact resistance, the reed contacts must be perfectly parallel and precisely positioned. Incorrect contact position, due to manufacturing imperfections or misuse, may adversely affect performance and life span of the relay. A certain degree of operational integrity of a relay may be verified by measuring resistance of its contacts when the relay is energized. However, such tests do not reveal slightly misaligned contacts, do not unveil marginal relays, and it is not always practical to perform them in complex devices that contain large numbers of relays.

A switching device in the form of a reed relay including a pair of magnetically soft reed contacts and control winding for effecting closure of the contacts is disclosed in U.S. Pat. No. 3,070,677 issued on Dec. 25, 1962 to Terrell N. Lowry.

A switching device capable of displaying different positions of its contact by respectively different colors is unknown.

A multicolor semiconductor lamp comprising a plurality of light emitting diodes for emitting light of respectively different colors is disclosed in U.S. Pat. No. 3,875,456 issued on Apr. 1, 1975 to Tsuyoshi Kano et al. The light emitting diodes are closely adjacent and covered by a layer of light scattering material to provide an appearance of a single light source.

SUMMARY OF THE INVENTION

The present invention endeavors to provide a method and apparatus for verifying the correct positions, in open and closed states, of a contact in a switching device.

It is the primary object of the invention to provide a switching device that includes a multicolor light emitting diode for indicating different positions of a movable contact by respectively different colors.

In summary, the invention resides in the addition, to a switching device, of a multicolor light source for directing a light beam on a movable contact. The light beam is reflected from the contact in accordance with its position on one of two light sensors. The output of the light sensor activated by the reflected light beam is used to control the color of the light beam to thereby indicate the position of the contact.

Further objects of the invention will become obvious from the accompanying drawings and their description.

BRIEF DESCRIPTION OF THE DRAWINGS

In the drawings in which are shown several possible embodiments of the invention.

Throughout the drawings, like characters indicate like parts.

DESCRIPTION OF THE PREFERRED EMBODIMENTS

Figure 1:
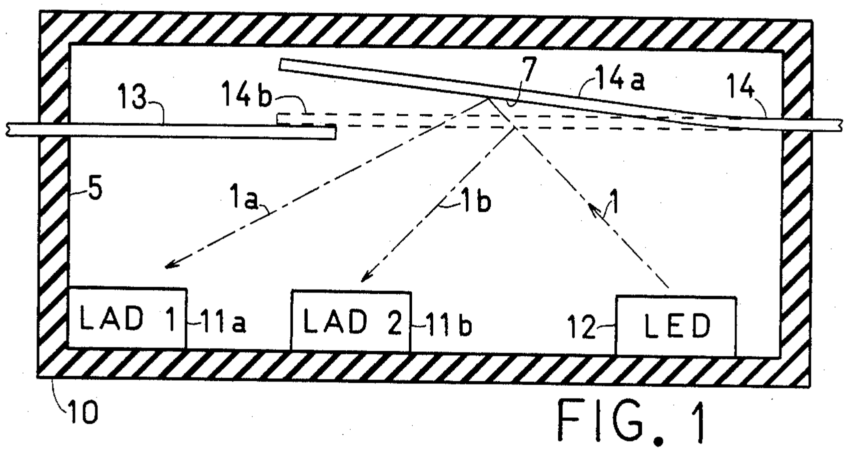
FIG. 1 is a cross-sectional view illustrating the inventive concepts of a switching device of the present invention.

Referring now, more particularly, to the drawings, in FIG. 1 is shown, in very general configuration, a switching device of the present invention in the form of a reed relay accommodated in a sealed opaque enclosure 10 having internal substantially non-reflecting surfaces 5. It would be obvious to those skilled in the art that the principles of the invention may be alternatively applied to other types of relays and switching devices, such are reciprocating, rotary, step-by-step, and armature types.

The switching device includes a pair of flat reed contacts 13, 14 extending through the enclosure and having overlapping ends inside thereof adapted for contact engagement. The reed contacts may be provided with externally projecting terminals adapted for joining conductors thereto (not shown). Stationary reed contact 13 is secured in one wall of the enclosure and a movable reed contact 14 having a flexible portion (not shown) and being capable of moving between its first angular position 14*a* and second angular position 14*b* is secured in the opposite wall. The switching device also includes a multicolor LED (Light Emitting Diode) 12 disposed within the enclosure and adapted for directing a light beam of a predetermined color on a reflecting surface 7 of the movable reed contact 14. Two LADs (Light Activated Devices) 11*a*, 11*b* are also disposed within the enclosure and oriented to respectively intercept reflected light beams 1*a*, 1*b*. When the movable contact is in its normally open position 14*a*, light beam 1 emitted by the LED 12 reflects from a reflecting surface 7, and reflected light beam 1*a* is directed on the active area of the LAD 11*a*. When the movable contact is in its closed position 14*b*, reflected light beam 1*b* is directed on the LAD 11*b*. The output of the LAD activated by the light beam is used to control the color of the light beam emitted by the LED, as will be more fully revealed subsequently, to thereby indicate the position of the movable contact.

The term 'light activated device' as used throughout the description of the invention is intended to be interpreted in a broad sense and may include phototransistors, photodiodes, photodarlingtons, phototriacs, photo sensitive silicon controlled rectifiers, photodetectors, photoresistors, photoconductive cells, and the like.

Figure 2:
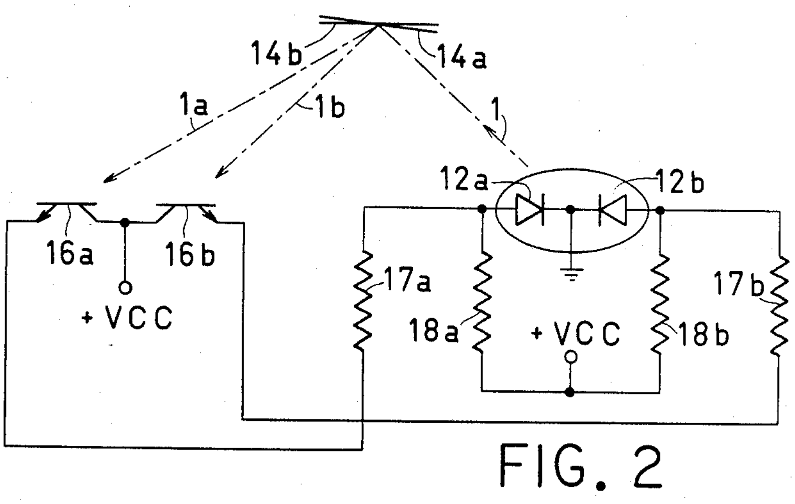
FIG. 2 is a schematic diagram of a circuit for verification of the contact position.

A device for verification of the contact position in the switching device of the present invention is illustrated in a schematic diagram form in FIG. 2. The device employs commercially well known phototransistors 16*a*, 16*b*, which exhibit very high resistance, typically hundreds of Megaohms, when maintained in dark and very low resistance, typically tens of Ohms, when illuminated, and a multicolor light source utilizing a red light emitting diode 12*a* and green light emitting diode 12*b*. When a positive voltage +VCC of a suitable value is applied to the circuit, current flows from +VCC, via resistor 18*a* and LED 12*a* to ground and, in parallel, via resistor 18*b* and LED 12*b* to ground. The resistors 18*a*, 18*b* are selected to have relatively large values. By way of an example, when voltage +VCC is +5 Volts and each resistor 18*a*, 18*b* is approximately 10 kOhms, the current in each LED branch will be approximately 0.5 mA. As a consequence, both LEDs faintly illuminate, and relatively faint light beam 1 of substantially yellow color will be produced by blending emissions of the red and green primary colors and will be directed to the movable contact. When the contact is in its position 14*a*, reflected light beam 1*a* is directed on the phototransistor 16*a*, thereby causing it to exhibit decreased resistance. Additional current now flows from +VCC, via lower resistance of the phototransistor 16*a*, current limiting resistor 17*a* of relatively small value and red LED 12*a* to ground. By virtue of a positive optical feedback between the LED 12*a* and phototransistor 16*a*, whereby the increase in luminance of the LED causes the decrease in resistance of the phototransistor which in turn has an effect of further increases in the luminance and further decrease in the resistance, the current in the phototransistor branch, from +VCC, via phototransistor 16*a*, resistor 17*a*, and LED 12*a*, sharply rises to a value sufficient to maintain the LED brightly illuminated. If we consider an exemplary value of the resistor 17*a* to be approximately 1 kOhm, current in the phototransistor 16*a* branch will reach approximately 5 mA. Thus the combined current through the red LED 12*a* will be approximately 5.5 mA, while current through the green LED 12*b* will remain to be approximately 0.5 mA. The red LED will be brightly illuminated and the green LED will be faintly illuminated. The color of composite light beam 1 will be therefore predominantly red. It is readily apparent that this state will exist as long as the contact is in its position 14*a*.

When the contact is in its other position 14*b*, reflected light beam 1*b* is directed on the phototransistor 16*b*, thereby causing it to exhibit decreased resistance. Additional current now flows from +VCC, via low resistance of the phototransistor 16*b*, resistor 17*b* and green LED 12*b* to ground. Considering again the resistor 17*b* to be approximately 1 kOhm, current in the branch of the phototransistor 16*b* will reach approximately 5 mA. Thus the combined current through the green LED 12*b* will be approximately 5.5 mA, while current through the red LED 12*a* will remain to be approximately 0.5 mA. The color of composite light beam 1 will be therefore predominantly green. This state will exist as long as the contact is in its position 14*b*.

When the contact is in an incorrect position different from the position 14*a* or 14*b*, e.g., because it is misaligned, bent, or broken, the reflected light beam will either fall in an incorrect direction or there will be no reflected light beam at all. There will be no optical feedback and both phototransistors 16*a*, 16*b* will exhibit very high resistances. Consequently, the light beam 1 will remain to be faint and of substantially yellow color, thereby indicating that the contact is out of position.

Figure 3:
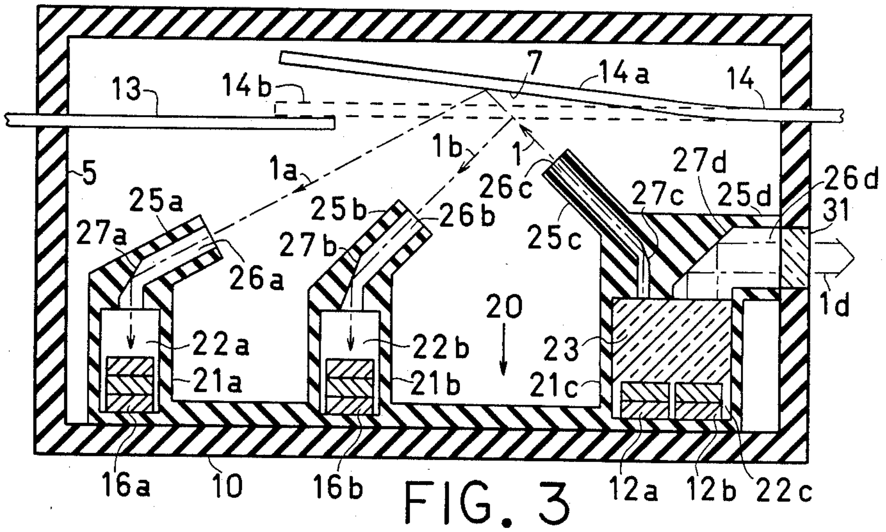
FIG. 3 is a cross-sectional view revealing internal structure of a switching device of the invention.

An important consideration has been given to physical arrangement of the light sources and sensors in the switching device of the invention, as illustrated in FIG. 3. The contact position sensing assembly is generally designated 20 and includes a chamber 21*c* having a cavity 22*c* formed therein for light emitting diodes 12*a*, 12*b* and chambers 21*a*, 21*b* having cavities 22*a*, 22*b* formed therein for respective phototransistors 16*a*, 16*b*. The dimensions of the chambers should be considered as merely illustrative and may be modified. The light signals emitted by light emitting diodes 12*a*, 12*b* are blended by passing through light scattering material 23 and emerge at its top surface as a composite light signal having color in accordance with the conditions of respective light emitting diodes. Larger portion of the composite light signal is reflected from an inclined reflecting surface 27*d* and directed by a director 25*d* through transparent member 31 out of the enclosure as a beam 1*d* to allow external visual observation of the contact position. Complete hermetic seal between the internal wall of the enclosure and the director 25*d* may be achieved by disposing a sealant adhesive therein so as to secure the interior of the enclosure from the presence of ambient light.

The remaining portion of the composite light signal is directed via relatively narrow aperture 26*c* in the light director 25*c*, reflected by the inclined reflecting surface 27*c*, and emerges from the end of the director as relatively narrow light beam 1 at an angle about 45 degrees from the longitudinal axis of the enclosure 10. The light beam reflects from the reflecting portion 7 of the movable contact 14 in accordance with its angular position. The reflecting portion of the contact may have the form of highly polished metallic surface or, alternatively, a miniature mirror secured to the contact surface. When the contact is in its open position 14*a*, reflected light beam 1a is directed into aperture 26*a* in the light director 25*a*, reflected by the inclined reflecting surface 27*a* to an active surface of the phototransistor 16*a*. When the contact is in its closed position 14*b*, reflected light beam 1*b* is directed into aperture 26*b* in the light director 25*b*, reflected by the inclined reflecting surface 27*b* to an active surface of the phototransistor 16*b*. The apertures 26*a*, 26*b* are slightly larger than the width of the expected light beam to allow for small deviations in the contact positions.

It would be obvious to those skilled in the art that, alternatively, light channeling devices such are mirrors, prismatic devices, lenses, optical fibers, filters, and the like, may be used.

The invention may be now briefly summarized. The method was disclosed of indicating position of a movable contact element in a switching device by directing a multicolor light beam on the reflecting surface of the contact element, obtaining therefrom a reflected light beam having a direction in accordance with the position of the contact element, and controlling the color of the multicolor light beam in accordance with the direction of the reflected light beam to thereby indicate the position of the contact.

A novel switching device capable of verifying correct positions of its contact was disclosed. The switching device is accommodated in a sealed opaque enclosure having internal substantially non-reflecting surfaces. A pair of contact elements extends through the enclosure and has contact ends inside of the enclosure adapted for engagement. At least one of the contact elements is movable between its first position, in which it closes an electrical path with the other contact element, and its second position, in which it opens the path. The movable contact element has a reflecting surface. A multicolor light source is disposed within the enclosure and adapted for directing a light beam on the reflecting surface of the movable contact element whereby a reflected light beam is obtained having a direction in accordance with the position of the movable contact element. Light sensors are provided for intercepting the reflected light beam to determine its direction. The color of the light beam is controlled in accordance with the direction of the reflected light beam to thereby indicate the position of the movable contact element. A portion of the light beam is directed out of the enclosure to provide an external visual indication of the contact position.

All matter herein described and illustrated in the accompanying drawings should be interpreted as illustrative and not in a limiting sense. It would be obvious that numerous modifications can be made in the construction of the preferred embodiments shown herein, without departing from the spirit of the invention as defined in the appended claims.

What I claim is:

1. The method of indicating a position of a contact element movable among a plurality of positions in a switching device, said contact element including a reflecting surface, by:

directing on said reflecting surface of said contact element a multicolor light beam capable of illuminating in one of a plurality of different colors;

obtaining from said contact element a reflected light beam having a direction in accordance with the position of said contact element;

determining the direction of said reflected light beam; and controlling the color of said multicolor light beam in accordance with the direction of said reflected light beam to thereby indicate the position of said movable contact element.

2. The method of indicating a position of a contact element movable between a first and second positions in a switching device, said contact element including a reflecting surface, by:

directing on said reflecting surface of said contact element a multicolor light beam capable of illuminating in one of at least two different colors;

obtaining from said contact element a reflected light beam having either a first or second direction in accordance with the position of said contact element;

determining the direction of said reflected light beam; and controlling the color of said multicolor light beam in accordance with the direction of said reflected light beam whereby said light beam illuminates in a first color when said contact element is in its first position and in a second color when said contact element is in its second position.

3. The method of indicating a position of a contact element as defined in the claim 2 more characterized by:

said multicolor light beam being capable of illuminating in one of three different colors; and illuminating said multicolor light beam in a third color when said light beam is not reflected in said first or second direction to thereby indicate that said contact element is not in its first or second position.

4. In a switching device, the combination comprising:

a sealed opaque enclosure having internal substantially nonreflecting surfaces;

a pair of contact elements extending through said enclosure and having contact ends inside of said enclosure adapted for engagement, at least one of said contact elements being movable between its first position, in which it closes an electrical path with the other contact element, and its second position, in which it opens said path, said movable contact element including a reflecting surface;

a multicolor light source disposed within said enclosure and adapted for directing a light beam on said reflecting surface of said movable contact element;

means for obtaining from said reflecting surface a reflected light beam having a direction in accordance with the position of said movable contact element;

means for determining the direction of said reflected light beam; and means for controlling the color of said light beam in accordance with the direction of said reflected light beam to thereby indicate the position of said movable contact element.

5. The combination as defined in the claim 4 further including means for directing a portion of said light beam out of said enclosure to provide an external visual indication of the position of said movable contact element.

6. In a switching device, the combination comprising:

a sealed opaque enclosure having internal substantially non-reflecting surfaces;

a pair of contact elements extending through said enclosure and having contact ends inside of said enclosure adapted for engagement, at least one of said contact elements being movable between its first position, in which it closes an electrical path with the other contact element, and its second position, in which it opens said path, said movable contact element including a reflecting surface;

a multicolor light source disposed within said enclosures, capable of being illuminated in one of at least two different colors, and adapted for directing a light beam on said reflecting surface of said movable contact element whereby a reflected light beam is obtained having either a first or second direction in accordance with the position of said movable contact element;

light sensor means disposed within said enclosure and adapted for intercepting said reflected light beam and for determining its direction; and means for controlling the color of said light beam in accordance with the direction of said reflected light beam to thereby indicate the position of said movable contact element whereby said light source illuminates in a first color when said contact element is in its first position and in a second color when said contact element is in its second position.

7. The combination as defined in the claim 6 further including means for directing a portion of said light beam out of said enclosure to provide an external visual indication of the position of said movable contact element.

8. The combination as defined in the claim 6 more characterized by:

said multicolor light source being capable of illuminating in one of three different colors; and means for illuminating said light beam in a third color when said light beam is not reflected in said first or second direction to thereby indicate that said contact element is not in its first or second position.

9. In a switching device, the combination comprising:

a sealed opaque enclosure having internal substantially non-reflecting surfaces;

a pair of contact elements extending through said enclosure and having contact ends inside of said enclosure adapted for engagement, at least one of said contact elements being movable between its first position, in which it closes an electrical path with the other contact element, and its second position, in which it opens said path, said movable contact element including a reflecting surface;

a multicolor light source disposed within said enclosure, capable of being illuminated in one of at least two different colors, and adapted for directing a light beam on said reflecting surface of said movable contact element whereby a reflected light beam is obtained having either a first or second direction in accordance with the position of said movable contact element;

first light sensor means disposed within said enclosure and adapted for intercepting the light beam reflected in said first direction;

second light sensor means disposed within said enclosure and adapted for intercepting the light beam reflected in said second direction; and means for controlling the color of said light beam in accordance with the direction of said reflected light beam to thereby indicate the position of said movable contact element whereby said light source illuminates in a first color when said first light sensor means detects a reflected light beam, to indicate that said contact element is in its first position, and in a second color when said second light sensor detects a reflected light beam, to indicate that said contact element is in its second position.

10. The combination as defined in the claim 9 further including means for directing a portion of said light beam out of said enclosure to provide an external visual indication of the position of said movable contact element.

11. The combination as defined in the claim 9 more characterized by:

said multicolor light source being capable of illuminating in one of three different colors; and means for illuminating said light beam in a third color when said first and second light sensor means do not detect a reflected light beam, whereby said light beam is not reflected in said first or second direction, to thereby indicate that said contact element is not in its first or second position.

12. In a switching device, the combination comprising:

a sealed opaque enclosure having internal substantially non-reflecting surfaces;

a pair of contact elements extending through said enclosure and having contact ends inside of said enclosure adapted for engagement, at least one of said contact elements being movable between its first angular position, in which it closes an electrical path with the other contact element, and its second angular position, in which it opens said path, said movable contact element including a reflecting surface;

a multicolor light source disposed within said enclosure, including a first and second light emitting diodes for emitting light signals of respectively different colors and a light signal of a composite color, and adapted for directing a light beam on said reflecting surface of said movable contact element whereby a reflected light beam is obtained having either a first or second direction in accordance with the position of said movable contact element;

first light sensor means disposed within said enclosure, coupled to said first light emitting diode, and adapted for intercepting the light beam reflected in said first direction, said first light sensor means exhibiting decreased resistance when illuminated;

second light sensor means disposed within said enclosure, coupled to said second light emitting diode, and adapted for intercepting the light beam reflected in said second direction, said second light sensor means exhibiting decreased resistance when illuminated;

power means applied to said coupled light sensor means and light emitting diodes:

whereby current flow through said first light emitting diode increases when said reflected light beam is directed on said first light sensor means, thereby causing said first light emitting diode to illuminate in a first color to indicate that said movable contact element is in its first position, and current flow through said second light emitting diode increases when said reflected light beam is directed on said second light sensor means, thereby causing said second light emitting diode to illuminate in a second color to indicate that said movable contact element is in its second position.

13. The combination as defined in the claim 12 more characterized by:

means for simultaneously illuminating said first and second light emitting diodes when said movable contact element is not in its first or second position whereby said multicolor light source illuminates in said composite color to thereby indicate that said movable contact element is out of position.

14. In a switching device, the combination comprising:

a sealed opaque enclosure having internal substantially non-reflecting surfaces;

a pair of contact elements extending through said enclosure and having contact ends inside of said enclosure adapted for engagement, at least one of said contact elements being movable between its first angular position, in which it closes an electrical path with the other contact element, and its second angular position, in which it opens said path, said movable contact element including a reflecting surface;

a multicolor light source disposed within said enclosure, including a first and second light emitting diodes for emitting light signals of respectively different colors and a light signal of a composite color, and adapted for directing a light beam on said reflecting surface of said movable contact element whereby a reflected light beam is obtained having either a first or second direction in accordance with the position of said movable contact element;

first power means for simultaneously faintly illuminating said first and second light emitting diodes when said movable contact element is not in its first or second position whereby said multicolor light sources faintly illuminates in said composite color to thereby indicate that said movable contact element is out of position;

first light sensor means disposed within said enclosure, coupled to said first light emitting diode, and adapted for intercepting the light beam reflected in said first direction, said first light sensor means exhibiting decreased resistance when illuminated;

second light sensor means disposed within said enclosure, coupled to said second light emitting diode, and adapted for intercepting the light beam reflected in said second direction, said second light sensor means exhibiting decreased resistance when illuminated;

second power means applied to said coupled light sensor means and light emitting diodes;

whereby current flow through said first light emitting diode sharply increases when said reflected light beam is directed on said first light sensor means, thereby causing said first light emitting diode to brightly illuminate whereby said multicolor light source illuminates predominantly in a first color to indicate that said movable contact element is in its first position, and current flow through said second light emitting diode sharply increases when said reflected light beam is directed on said second light sensor means, thereby causing said second light emitting diode to brightly illuminate whereby said multicolor light source illuminates predominantly in a second color to indicate that said movable contact element is in its second position; and means for directing a portion of said light beam out of said enclosure to provide an external visual indication of the position of said movable contact element.

* * * * *